US012788037B2

(12) United States Patent
Herrmann et al.

(10) Patent No.: US 12,788,037 B2
(45) Date of Patent: Nov. 10, 2026

(54) CREAM CHEESE-LIKE FOOD PRODUCT AND PRODUCTION METHOD

(71) Applicant: HOCHLAND SE, Heimenkirch (DE)

(72) Inventors: Dirk Herrmann, Amtzell (DE); Matthias Rother, Wangen (DE); Marie-Luise Mahler, Lindenberg (DE)

(73) Assignee: HOCHLAND SE, Heimenkirch (DE)

( * ) Notice: Subject to any disclaimer, the term of this patent is extended or adjusted under 35 U.S.C. 154(b) by 407 days.

(21) Appl. No.: 18/238,059

(22) Filed: Aug. 25, 2023

(65) Prior Publication Data

US 2023/0397640 A1 Dec. 14, 2023

Related U.S. Application Data

(62) Division of application No. 15/756,080, filed as application No. PCT/EP2016/068958 on Aug. 9, 2016, now Pat. No. 11,771,118.

(30) Foreign Application Priority Data

Sep. 25, 2015 (DE) ..................... 10 2105 116 249.0

(51) Int. Cl.
*A23L 25/00* (2016.01)
*A23C 20/02* (2021.01)

(52) U.S. Cl.
CPC .............. *A23L 25/30* (2016.08); *A23C 20/02* (2013.01)

(58) Field of Classification Search
CPC ................................ A23L 25/00; A23L 25/30
See application file for complete search history.

(56) References Cited

U.S. PATENT DOCUMENTS 4,639,374 A 1/1987 Matsunobu et al.
9,011,949 B2 4/2015 Brown et al.
(Continued)

FOREIGN PATENT DOCUMENTS

DE 19834925 A1 2/2000
DE 102006037608 A1 2/2008
(Continued)

OTHER PUBLICATIONS

TofuTown.com (DE 20 2011 002097 U1—Google English translation). (Year: 2011).*
(Continued)

*Primary Examiner* — Elizabeth Gwartney
(74) *Attorney, Agent, or Firm* — Bachman & LaPointe, P.C.

(57) ABSTRACT

A method for producing a cream cheese-like, in particular vegan food product, in particular having a solidity in a value range between 0.2 N and 7.0 N measured at 10° C., and a corresponding food product, wherein the in particular cream cheese-like food product has a particle size distribution in a non-macerated state, with a particle size distribution, measured in distilled water, with an average particle diameter x50,3<100 μm, preferably between 10 and 40 μm, and with at least one peak, in particular a global maximum, at a particle diameter x3>10 μm, and in that, in a partially macerated state obtained by mixing one part by weight of the food product with 9 parts by weight of an SDS-EDTA solution (0.25% SDS, 0.25% EDTA), the food product has a particle size distribution with at least one additional peak at a particle diameter x3<10 μm in relation to the non-macerated state.

19 Claims, 4 Drawing Sheets

(56) References Cited

U.S. PATENT DOCUMENTS

| | | | |
|---|---|---|---|
| 2008/0063752 | A1 | 3/2008 | Perez Martinez et al. |
| 2011/0064862 | A1 | 3/2011 | McCready |

FOREIGN PATENT DOCUMENTS

| | | | |
|---|---|---|---|
| DE | 202007017700 | U1 | 4/2009 |
| DE | 202011002097 | U1 | 3/2011 |
| EP | 1102550 | B1 | 10/2005 |
| EP | 2731451 | B1 | 9/2018 |
| GB | 874537 | A | 8/1961 |
| WO | 0008121 | A2 | 2/2000 |
| WO | 2013010037 | A1 | 1/2013 |

OTHER PUBLICATIONS

Hofmann et al., "Lactic Fermentation of Ground Soybean for Use in Imitation Cream Cheese Products", Journal of Food Science, vol. 50, (1985), pp. 325-329. (Year: 1985).*

Perry et al., "Harvesting and Storing Your Home Orchard's Nut Crop: Almonds, Walnuts, Pecans, Pistachios, and Chestnuts"—University of California, Division of Agriculture and Natural Resources, Publication 8005, 1998, p. 1-9.

NutritionValue.Org, "Nuts, almonds"—https://www.nutritionvalue.org/Nuts%2C_almonds_nutritional_value.html, 2020, downloaded May 5, 2020.

* cited by examiner

CREAM CHEESE-LIKE FOOD PRODUCT AND PRODUCTION METHOD

CROSS-REFERENCE TO RELATED APPLICATIONS

This application is a divisional of U.S. patent application Ser. No. 15/756,080, filed Feb. 28, 2018, which is a 371 of PCT/EP2016/068958, filed Aug. 9, 2016, which claims priority to German patent application no. 10 2105 116 249.0, filed Sep. 25, 2015.

BACKGROUND OF THE INVENTION

The invention relates to a method for producing cream cheese-like, preferably vegan, food products, especially a particle suspension based on nuts and/or seeds. Similarly, the invention relates to a preferably cream cheese-like, especially vegan, food product based on nuts and/or seeds.

Eating habits are always changing. Currently, there is a trend toward vegan products, such as vegan spreads, which attempt to imitate conventional, nonvegan products, such as, for example, milk-based cream cheese. In practice, this has so far only been moderately successful for products on the market, in particular vegan spreads based on nuts and/or seeds. Firstly, the known substitute products differ distinctly with respect to the mouthfeel of traditional cream cheese and are perceived as coarse or gritty depending on the product. Furthermore, the vegan spreads currently on offer, for example cashew-based spreads, are distinguished by a rather gray color impression which differs distinctly from a typically white color and a high lightness value L* in the CIELAB color space as exhibited by traditional cream cheese.

One possible method for producing a vegan food product based on seeds or nuts is, for example, described in EP 1 102 550 B1. To produce the food product, seeds or nuts are processed with addition of water to form a stirrable, mushy substance, to which oil is then added. For the final adjustment of the consistency, acid is then added to the substance resulting from the addition of oil.

DE 198 34 925 C5, too, describes a method for producing a vegan food product based on seeds or nuts, wherein the patent specification teaches the production of a stirrable substance from the comminution of seeds or nuts with addition of water in a certain weight ratio, to which stirrable substance oil or liquefied fat is added, again in a certain weight ratio, wherein a final acidification then takes place in order to adjust the consistency.

Similarly, DE 20 2007 017 700 U1 deals with the production of cream-cheese substitute products, wherein the publication teaches the mixing of cashews, which are granule-free due to comminution, while stirring with soy milk in a certain proportion, followed by the pasteurization thereof, the cooling thereof and the acidification thereof through addition of microorganisms, yielding a soured milk-like substance. From said substance, as in the case of traditional cheese production, a whey-like liquid is then removed and, in this way, a raw mixture of desired consistency is obtained, it being possible to improve the taste of the raw mixture by addition of spices and/or herbs. The publication further states that it is possible to achieve a creamy consistency through the processing of the raw mixture with a quark mill.

GB 874 537 A describes a protein-containing food product based on oilseeds, wherein the plant protein is first separated from the oil content. In the course of this, an aqueous solution of the plant protein is produced, and fat is added to the aqueous protein solution before said solution is heated. The publication teaches that the heating gives rise to a kind of curd which can be processed similar to traditional cheese curd.

DE 20 2011 002 097 U1 likewise discloses a cream-cheese substitute product based on nuts. In this case, nuts are first soaked in water for several hours and then ground to form a puree, which is mixed with water, heated and then cooled and admixed with bacterial cultures. After a ten-hour fermentation, the dry mass is adjusted with water to 33% and the product is pasteurized.

U.S. Pat. No. 4,639,374 A does not deal with cream cheese-like food products, but with an almond paste, produced on the basis of almonds, sugar and emulsifiers, as a base for beverages, for example by mixing of the almond paste with milk, or for further processing to yield a dessert. As part of the known method, the almonds are ground, with the processing being carried out with addition of emulsifiers and large amounts of sugar, which sugar is, according to the teaching of the publication, essential to the comminution process carried out on rollers. Example 4 in the publication mentions the use of a homomixer and a homogenizer, although the texture of the production result is not described. According to the publication, an oil-in-water emulsion is formed, supported by the emulsifiers added.

US 2011/0064862 A1 likewise does not deal with cream cheese-like products, but with the production of a milk based on nuts, wherein a nut butter is mixed with water for this purpose. In the case of such milk-like products, the stabilization of the products is more important than the structure, which differs distinctly from cream cheese-like products, which are distinguished by an increased firmness.

DE 10 2006 037 608 A1 describes a method for producing a spread. All of the ingredients to be used are already jointly comminuted in a first step with addition of water. The publication teaches that the oilseeds used are preferably already soaked beforehand. The result is that the formation of large agglomerates/particles is to be expected for the known method, in which there is no initial production of a pasty mass which is then further processed in a separate step by addition of water to yield a pumpable mass.

WO 2013/010037 A1 (EP 2731451 A1) is an alternative method for producing a cheese substitute product based on almonds, wherein the publication teaches the removal of almond fibers. An essential feature of the known production method is the use of the crosslinking enzyme (transglutaminase).

SUMMARY OF THE INVENTION

Proceeding from the aforementioned prior art, it is an object of the invention to establish a method for producing an improved food product, specifically a cream-cheese substitute product, based on nuts and/or seeds, which food product, with respect to its mouthfeel, comes as close as possible to the mouthfeel generated by traditional cream cheese based on milk. Very particularly preferably, the aim is to design the method such that the resulting food product also exhibits a lightness L* in the CIELAB color space that comes close to a traditional cream cheese and very particularly preferably also exhibits a naturally white color impression. It is further an object to specify a correspondingly improved food product, especially as cream-cheese substitute product.

This object is achieved, with respect to the method, by the features disclosed herein and, with respect to the food product, also by the features disclosed herein. Advantageous further developments of the invention are specified in the dependent claims.

To avoid repetition, features disclosed in relation to the method are also to be considered as disclosed in relation to the device and to be claimable in relation to the device. Similarly, features disclosed in relation to the device should also be considered as disclosed in relation to the method and be claimable in relation to the method.

First of all, the invention is based on the finding that cream-cheese substitute products on the market that are based on nuts or seeds differ distinctly, with respect to the organization of their microstructural level, from traditional cream cheese based on milk. It is suspected that this difference is the cause of the differing mouthfeel between known cream cheese products and traditional cream cheese. It is also suspected that the microstructure which differs from cream cheese is responsible for the rather gray color impression which is produced by known substitute products for the consumer.

A microscopic analysis of known vegan cream-cheese substitute products has revealed that the microstructural level thereof is, in contrast to traditional cream cheese based on milk, not formed by a pure microparticle gel suspension in which the fat phase is completely incorporated in microgel particles, as is the case for traditional cream cheese, but clearly visibly comprises, upon microscopic analysis, a separate fat phase consisting of fat-droplet particles. This finding was then used as a basis to develop the method according to the invention, which method is designed so as to create microstructures in the especially milk-free, preferably vegan, food product according to the invention, which microstructures are comparable with the microstructures of traditional cream cheese, i.e., in which microstructures the fat phase is completely incorporated in microgel particles at least to the greatest possible extent, preferably at least approximately completely incorporated in microgel particles.

Besides a sufficient comminution of the fat particles and the incorporation of the fat phase into the microgel particles of the food product, it is necessary according to the finding underlying the invention to design the method such that a particle size distribution of the food product meets certain boundary conditions (characteristic values) and, in doing so, preferably comes as close as possible to a typical particle size distributions of traditional cream cheese based on milk. With this said, the method according to the invention and also the preferably cream cheese-like, very particularly preferably vegan, food product according to the invention will be explained below.

The invention envisages providing first of all a pasty mass of comminuted nuts and/or seeds. In a further development of the invention, said pasty mass can, as will be explained later on, be produced before the provision as a component of the method (itself). It is very particularly preferred when the pasty mass is or has been produced from light nuts and/or light seeds in order to also obtain a similarly white color impression like cream cheese. The method according to the invention then has, as will likewise be explained, particular influence on the lightness L* in the CIELAB color space, which lightness is (distinctly) increased in an inventive or specific configuration of the method. What appears to be very particularly suitable for this purpose is the production of the pasty mass from almonds, very particularly preferably solely from almonds or having a proportion of almonds of over 50% by weight, yet further preferably over 80% by weight.

Water is then added to the pasty mass in order to adjust the proportion by weight of dry mass, and so a pumpable mass having a proportion by weight of dry mass of less than 80%, preferably less than 60%, particularly preferably of less than 40%, is obtained.

A further essential feature of the method according to the invention consists in said method comprising at least one heating step (warming step) and at least one mechanical processing step for obtaining the food product according to the invention from the pumpable mass, which steps are designed or to be carried out such that the resulting food product corresponds, with respect to the organization of its microstructural level, at least approximately to the microstructural level of traditional cream cheese, i.e., such that a large part of the fat phase, preferably at least approximately the entire fat phase, is not present separately, i.e., as an independent phase visible upon microscopic analysis, but is incorporated into the microgel particles of the food product, i.e., such that a microgel particle suspension which is as extensive or pure as possible is present and, moreover, the mean particle diameter x50,3 of the food product undisrupted by a solvent, i.e., unaltered, as measured in distilled water, especially by means of a laser diffraction spectrometer, is <100 μm, preferably between 10 μm and 40 μm, this in turn corresponding to the mean particle diameter x50,3 of traditional cream cheese products. In this connection, it is highly essential that the mechanical processing is executed such that there is a sufficiently high pressure and/or input of shear force into the pumpable mass, and to ensure the desired comminution as well as homogenization and incorporation of the fat phase into the microgel particles. In other words, at least one peak, very particularly preferably a global maximum, of the particle size distribution of a food product according to the invention is an x3 particle diameter greater than 10 μm.

The particle size distribution of the undisrupted, i.e., unaltered, food product according to the invention, which distribution was preferably measured or determined as described above, has, with sufficient heating and sufficient mechanical processing, at least one peak (maximum), very particularly preferably a global maximum, at a particle diameter x3>10 μm.

To demonstrate that the fat phase is, to the desired extent, preferably at least largely, further preferably completely, not present as a free phase, but is, according to the invention, incorporated into the microgel particles of the food product, a further condition must be met with correct heating and mechanical processing. Namely, the food product must, in a partially disrupted state obtained by mixing one part by weight of the (unaltered) food product with nine parts by weight of an SDS-EDTA solution (0.25% SDS; 0.25% EDTA), have a particle size distribution which is distinguished from the particle size distribution of the undisrupted food product (see above) by at least one further or additional peak at a particle diameter x3<10 μm. In other words, it is possible to observe in the partially disrupted state in a particle size range <10 μm a peak, especially a local maximum, which does not occur in the undisrupted state. This additional peak in the partially disrupted state is namely generated by fat or oil droplets of the fat phase of the food product, which droplets were liberated from the microgel particles by the addition of the SDS-EDTA solution and are therefore present as a free phase and thus influence the particle size distribution. The presence of the additional peak in a particle size range of <10 μm is thus proof that the heating and mechanical processing step was carried out according to the invention or in a correct manner, i.e., that the pumpable mass was exposed to sufficient heating and to sufficient mechanical stress, especially to pressure and/or shear stress, in order to at least largely incorporate the fat phase into the microgel particles.

In addition to the abovementioned mechanical processing step, it is possible, if required, to carry out additionally (at least one) further mechanical processing step, especially before the abovementioned processing step, very particularly preferably before the heating step, especially in order to break up and to comminute fat droplets. Here too, a high-pressure homogenization is provided, especially, but not necessarily, with an identical or low application of force on the mass, i.e., especially with an identical or smaller pressure. As a result of the realization of a further (prior) mechanical processing step, especially a high-pressure homogenization, it is possible for the application of force in the (later or actual) mechanical processing step to turn out lower than in the above-described configuration with only one mechanical processing step.

DETAILED DESCRIPTION

Figure 1:
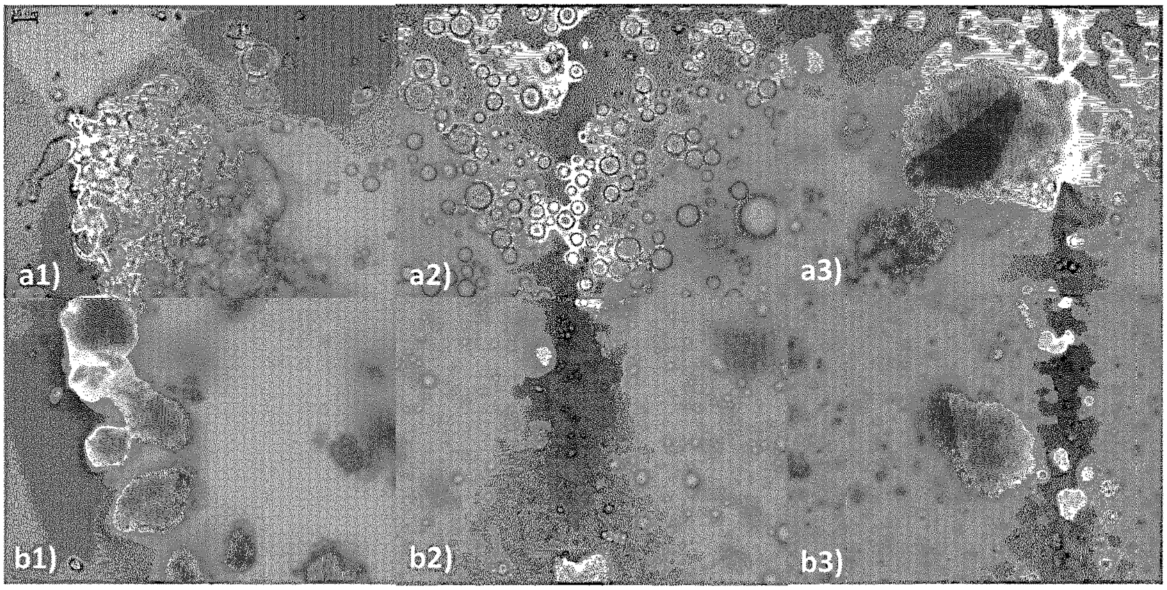
FIG. 1 shows different micrographs of prior art and inventive food products.
Figure 2:
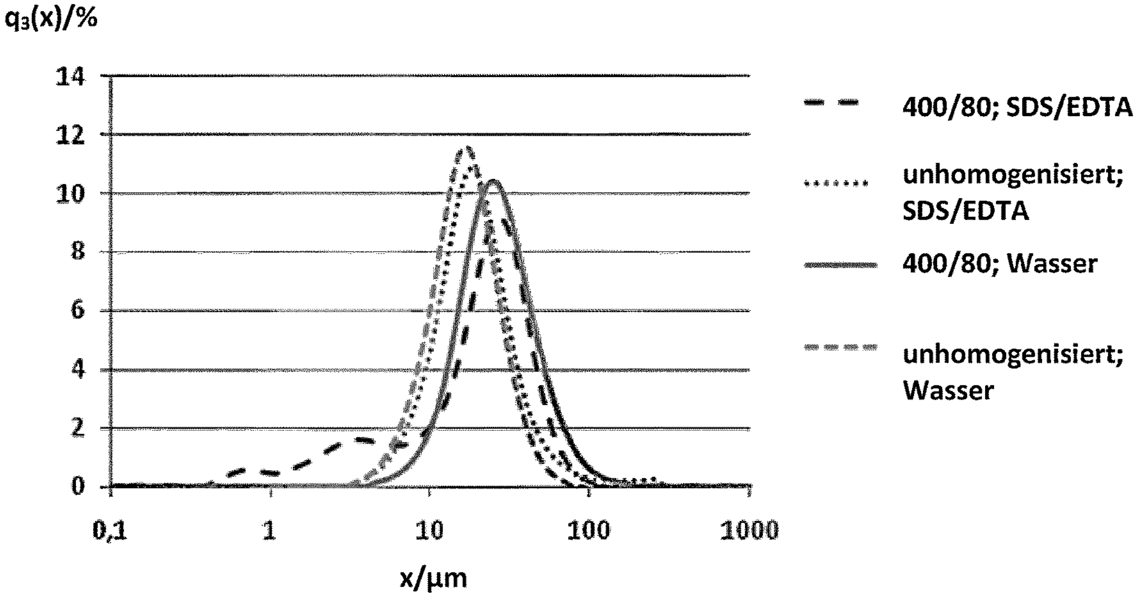
FIG. 2 shows particle size distributions of food products according to the prior art and also according to the invention.

The illustrations in FIGS. 1 and 2 reveal the effects of the method according to the invention and the advantageousness thereof as well as the nature of the microstructure of the food product which is according to the invention and preferably results from a method according to the invention, in comparison with a food product in which the mechanical processing according to the invention was dispensed with.

Thus, FIG. 1 shows different micrographs in six pictures a1, a2, a3, b1, b2 and b3. They were prepared under a light microscope at 40-fold magnification. Image a1 shows the photograph of an almond-based food product dispersed in distilled water and not artificially disrupted, i.e., unaltered, which food product was produced in accordance with the prior art without additional mechanical processing according to the invention. Besides microgel particles situated in the center of the picture, it is possible to identify a multiplicity of free, spherical fat droplets, which form a fat phase separate from the microgel particles.

Image a2 shows the noninventive food product in the state of partial disruption with SDS-EDTA solution, focusing on fat droplets, whereas image a3 shows the noninventive food product likewise in the state of partial disruption with SDS-EDTA solution, focusing on microgel particles.

The food product according to the invention differs distinctly therefrom.

Image b1 shows a food product according to the invention which, during production, was heated to above 65° C. and additionally mechanically processed, in this case by a, for example two-step, high-pressure homogenization in which the heated pumpable mass was conveyed through a first nozzle (preferably a, for example annular, die) against an impact surface with 400 bar and 80 bar counterpressure, and then through a second nozzle (preferably a, for example annular, die) against a further impact surface with 80 bar. The underlying food product was produced purely on the basis of almonds, i.e., without other seeds and without nut addition. What can be identified is that substantially no free fat droplets can be identified in the undisrupted, i.e., unaltered, state (dispersed in water) according to image a1. This changes as a result of disruption by addition of SDS/EDTA solution, as is evident from images b2 and b3, wherein image B2 was recorded focusing on fat droplets and image b3 was recorded focusing on microgel particles. This means that, although the food product according to the invention has a considerable proportion of fat, said proportion of fat is substantially not present as a free phase, but is embedded in the microgel particles, this being achieved by the procedure according to the invention, especially an appropriate heating and mechanical processing, and must first be liberated therefrom for visualization.

Figure 6:
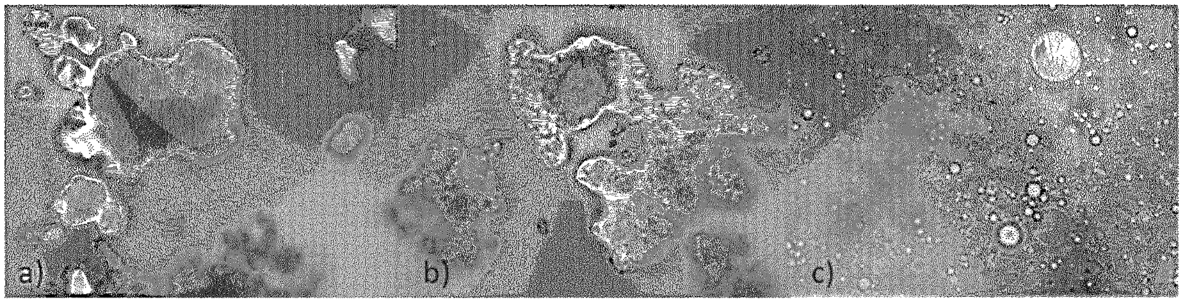
FIG. 6 displays light micrographs at 40-fold magnification of 3 food products diluted in water.

FIG. 6 displays the light micrographs, at 40-fold magnification, of 3 food products diluted in water. FIG. 6 *a* is an almond-based food product produced according to the invention, wherein the mechanical processing was executed as a two-step homogenization step at 200 bar/40 bar. FIG. 6 *b* is a commercially available milk-based double cream cheese product. In both micrographs, it is possible to identify microgel particle suspensions of similar order of magnitude, substantially without a free fat-droplet phase. Deviating therefrom, FIG. 6 *c* displays a commercially available cashew-based sample, focusing on free fat droplets which are clearly not completely incorporated into the particles of the food product. Thus, said commercially available sample is also not a pure microgel particle suspension. The particle size distribution graph FIG. 2 (density or frequency distribution graph), which is a semilogarithmic graph, shows four different particle size distributions. The "unhomogenized; water" curve is the particle size distribution of a prior-art food product according to image a1 of FIG. 1, "unhomogenized" meaning here that, in combination, no heating and mechanical processing according to the invention has taken place. It is possible to identify an approximately ideal bell-shaped curve, without a peak in a particle size range x3<10 μm.

Such a peak is also missing for the "unhomogenized; SDS/EDTA" curve, which was determined by admixing the aforementioned food product with SDS/EDTA solution, as is shown in images a2 and a3 according to FIG. 1. Since the disrupted fat spheres are to be found in a size range of the microgel particles, they do not appear in this particle size distribution as a separate peak at a particle size x3<10 μm.

The "400/80; water" particle size distribution is the particle size distribution of a food product formed according to the concept of the invention, which food product is shown for example in image b1 according to FIG. 1. Here, an inventive heating and mechanical processing has taken place, and the result of this is that there is substantially no free fat phase—this particle size distribution curve, too, shows no peak at a particle size x3<10 μm. It is possible to identify a peak, in this case a global maximum, at a particle size of x3 of about 15 μm.

If this food product according to the invention is partially disrupted by addition of SDS/EDTA, the result is the "400/80; SDS/EDTA" particle size distribution. Here, it is possible to observe an additional peak (local maximum), compared with the undisrupted "400/80; water" particle size distribution, at a particle size of about 3 μm, and as a result, the use of the method according to the invention, especially the correct execution of the heating and mechanical processing step, is demonstrated. The size and position on the X-axis of the peak (global maximum) for the x3 particle size >10 μm is barely changed.

Figure 3:
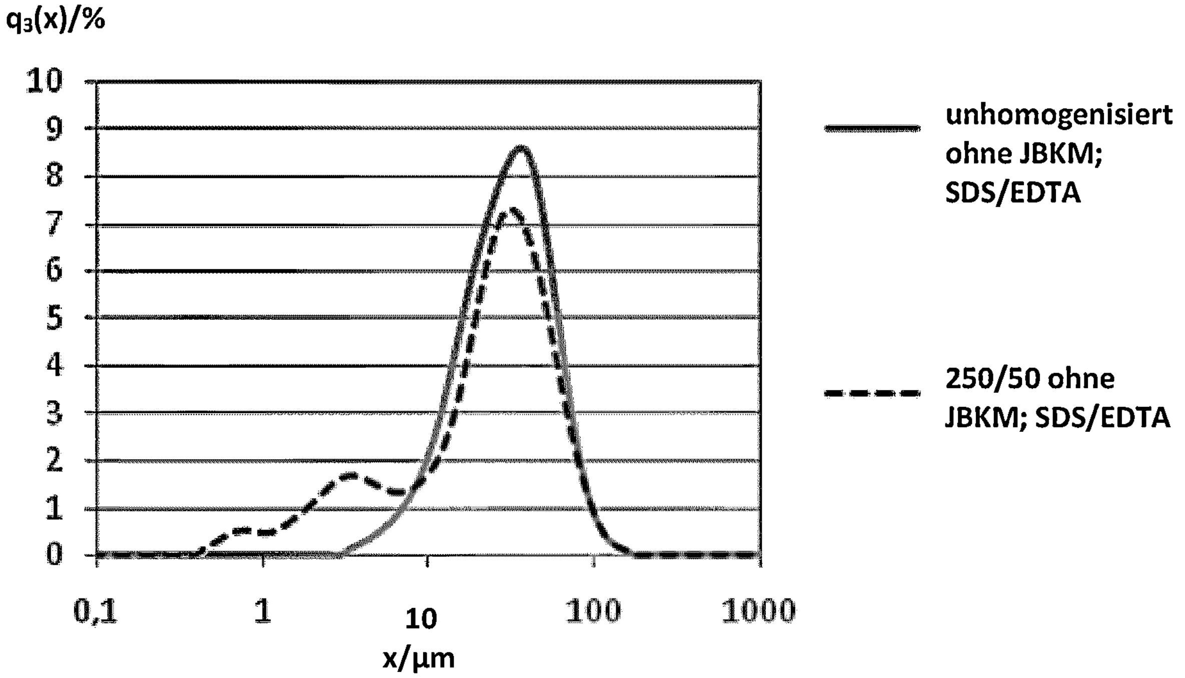
FIG. 3 shows particle size distribution for "unhomogenized without LBG; SDS-EDTA" and also for "250/50 without "LBG; SDS-EDTA"

Merely in addition and for the sake of completeness, it should be pointed out that the effect of establishing an additional peak at a particle size <10 μm in the partially disrupted state in comparison with the undisrupted state can solely be attributed to the inventive execution of the heating and mechanical processing step and not to the use of an optional thickener, such as locust bean gum, by means of which the stabilization of small droplets is favored in principle. For instance, in the case of a test preparation, whose "250/50 without LBG; SDS/EDTA" particle size distribution in the partially disrupted state is depicted, was compared with the particle size distribution of a partially disrupted sample of a food product which was not heated and mechanically processed according to the invention, the use of locust bean gum being dispensed with here. This particle size distribution is referred to as "unhomogenized without LBG; SDS/EDTA" in FIG. 3. What is also confirmed here is the need for an inventive heating and mechanical processing of appropriate intensity in order to generate a small-volume fat-droplet fraction, which is depicted as a separate peak in the particle size range <10 μm of the particle size distribution.

Figure 4:
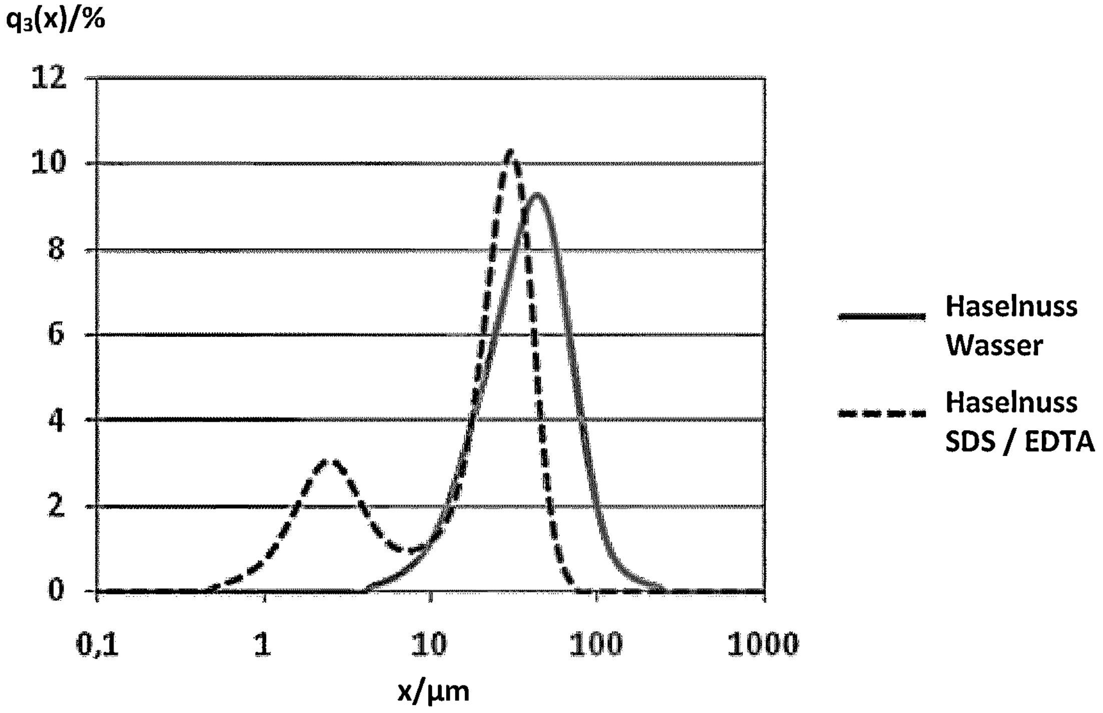
FIG. 4 shows particle size distributions of an alternative embodiment of a food product according to the invention.

FIG. 4 shows the particle size distributions of an alternative, inventive food product based on almonds and hazelnuts. It is also possible to identify here that it is possible to observe an additional peak at <10 μm, specifically at about 2 μm, in the partially disrupted state "hazelnut SDS/EDTA" compared with the undisrupted state "hazelnut water". Said peak results from the combination of heating and mechanical processing.

The detection of the fat-droplet fraction thus serves as analytical proof of a heating and mechanical processing step carried out according to the invention.

In principle, preference is given, especially when a vegan food product is to be produced, to using sole vegetable fats and/or oils as part of the method, and, as an alternative, it is also possible to use animal fats and/or oils, especially when the vegan property is not relevant.

For better understanding of the invention, terms that are used and analysis or measurement-value methods that are preferred will be defined below:

The particle size distributions are preferably particle size distributions obtained by means of a laser diffraction spectrometer, i.e., semilogarithmic density distributions of a volume-specific equivalent diameter x3 in a particle size distribution graph (semilogarithmic density distribution curve), shown by way of example in FIG. 2, in which graph the volume-specific equivalence diameter x3 is plotted on the horizontal axis (X-axis) and the percentage frequency (particle size distribution density) of the particles is plotted on the vertical axis (Y-axis). In this connection, particles are to be understood to mean all units capturable by a laser diffraction spectrometer, i.e., not only solids, agglomerates, but also droplets, such as fat droplets. All particle size distributions discussed and claimed in the application were determined using an LA-960 laser diffraction spectrometer from Retsch Technology GmbH, Germany, wherein a refractive index of 1.33 was always taken as a basis for the calculation. The measurement of the particle size distribution of the undisrupted, i.e., unaltered, food product is achieved by dispersion of the food product in distilled water. To this end, the samples were added in undiluted form to the measurement cell filled with distilled water and measurements were carried out four times, with particle agglomerates being broken up by recirculation in the measurement cell until a stable measurement value appears. The first three measurements serve to demonstrate that a stable measurement value has appeared. The fourth measurement is used to determine the particle size distribution.

To attain the food product (for the detection of the fat particles or for the liberation/freeing of the fat particles) from the microgel particles, one part by weight of food product sample, especially 10 g, and 9 parts by weight of SDS-EDTA solution (0.25% SDS; 0.25% EDTA), especially 90 g of said solution, is disrupted using a magnetic stirrer at 200 rpm at room temperature for 30 min. As a result of the partial disruption, the previously incorporated fat droplets are freed from the microgel particles and are stabilized by SDS. SDS is sodium dodecyl sulfate, i.e., an anionic surfactant, and EDTA is ethylenediaminetetraacetic acid.

The treatment with SDS/EDTA solution must be referred to as a partial disruption, since the method used does not lead to a complete disruption and, in addition to the released fat droplets, particles also remain in the measurement suspension. The measurement suspension thus produced is added to the measurement cell filled with distilled water for measurement. Here too, measurements are carried out preferably four times by means of an above-described laser diffraction spectrometer for the determination of the particle size distribution, with the smallest measured particle size distribution being used for interpretation.

The characteristic values of the particle size distributions, as used in the context of the application, will be explained below.

x50,3 is a characteristic value for volume-based particle size distribution. This is specified in μm and means that 50% of the total particle volume consists of particles which are smaller than the mean particle size x50,3. Therefore, the characteristic value X50,3 gives an indication of the mean particle size and is referred to as such.

Analogously, the characteristic value x10,3 means that 10% of the total particle volume consists of particles which are smaller than the particle size x10,3. Therefore, this gives an indication of the typical size of small particles.

Likewise analogously, the characteristic value x90,3 means that 90% of the total particle volume consists of particles which are smaller than the particle size x90,3. Therefore, this characteristic value gives a characteristic value of the typical size of relatively large particles.

In general, the specification x3 is a volume-specific particle equivalence diameter.

q3 (x) refers to the percentage frequency, i.e., the particle size distribution density.

For the microscopic analysis carried out as part of this patent application, 1 g of undisrupted sample was in each case mixed in a test tube with 9 g of Ringer's solution and finely dispersed by means of a test-tube shaker. The dispersion thus produced was applied to a slide and analyzed under a light microscope at 40-fold magnification.

For the analysis of partially disrupted samples, the partially disrupted dispersion was applied to a slide and analyzed under a light microscope at 40-fold magnification.

Measurement of firmness to determine firmness were carried out using a texture testing machine (zwicki Z 5.0 TN, Zwick GmbH & Co. KG, Germany). For the measurements, the samples were adjusted in temperature to 10° C. for 12 hours and removed from cooling only just before the measurement. For the measurement, a round test punch having an area of 1.27 cm2 penetrates 10 mm into the sample at a rate of 2 mm/sec.

The maximum force absorption of the sensor is specified as the firmness measurement value.

For rheological measurements, a rotational viscometer (Rheomat R180, ProRheo, Germany) was used. Measurements were carried out with a 14 mm measurement body (measurement body 3, ProRheo, Germany) in a sample vessel of 55 mm diameter. The measurement is carried out at a set speed of 50 l/min (measurement program 3, measurement body 3 without measurement tube). Over the period of 4 min, 20 measurement points are recorded altogether. All the samples were measured at 10° C.±2° C.

For the sensory characterization of the texture property coarse-thick, use was made of a sensory panel in accordance with DIN 10957, wherein the reference product used for the property coarse-thick was a low-fat quark containing 20% fat in the dry mass.

Color and lightness measurements were carried out in the CIELAB color space in accordance with EN ISO 11664-4: 2011. For this purpose, use was made of: Dr. Lange spectrocolor LMG 183 color spectrometer. In this connection, the values L*, and b* are the Cartesian coordinates of the color space, as defined in the DIN standard. Here, the L* axis describes lightness (luminance) of the color with values from 0 to 100. The L* axis is also referred to as neutral gray axis, since all achromatic colors (shades of gray) are contained between the end points black (L*=0) and white (L*=100). The a* axis describes the green or red component of a color, with negative values representing green and positive values representing red. The b* axis describes the blue or yellow component of a color, with negative values representing blue and positive values representing yellow.

As explained, the food product according to the invention is very similar, with respect to its microstructuring, to a traditional cream cheese, and this is reflected especially also in the sensory properties, especially the mouthfeel of the food product according to the invention. For instance, the main attribute of the traditional cream cheese character is the texture term coarse-thick. Analogous to traditional cream cheese, the rating of this sensory feature, which is to be carried out as described above, is, using a low-fat quark containing 20% by weight of fat in the dry mass, above 2.5 and preferably in a range between 3 and 7.5. A food product according to the invention or the method result of the method according to the invention corresponds preferably as well to the ratings of traditional cream cheese for the further texture attributes of a smooth mass (reference: cold butter), rapid melting (reference: cold sour cream—minimal processing) and soft (reference: cold sour cream, stirred). Preferably, here too, the ratings are in the value ranges specified for coarse-thick, the further sensory analyses also being carried out in accordance with DIN 10957.

The heating method step is particularly preferably carried out before the mechanical processing, it being appropriate when the pumpable mass is mechanically processed while in the heated state. In principle, it is, however, possible to carry out the heating step before and/or during and/or after the mechanical processing. Also, it is possible to carry out the heating step solely before or solely during or solely after the mechanical processing. As will be explained later on, it is preferred when the heating step fulfills the conditions of a pasteurization, i.e., is carried out such that the temperature to which heating was carried out is held for a sufficiently long period in order to achieve a certain microbial count result, preferably of no more than 1000 microbes/g of food product.

With respect to the choice of temperature for the heating step, there are various possibilities. What is essential is that the desired microstructure is obtained (in combination with the mechanical processing). In general, it is preferred when heating is carried out to a temperature of at least 65° C., especially a temperature from a temperature range between 65° C. and 140° C., particularly preferably to a temperature from a temperature range between 75° C. and 79° C. As a measure of a sufficient heating step, it is also possible to use a rise in viscosity that is associated with the heating, i.e., a comparison of the viscosity of the mass before and after the heating. Preferably, the heating is executed such that, as a result of the heating step, there is a rise in viscosity by at least 100%, preferably by at least 300%. Preferably, the heating and the mechanical processing are carried out together or successively such that the heating and mechanical processing step leads altogether to a rise in viscosity of at least 250%, preferably at least 500%, very particularly preferably over 600% or over 700%.

The heating is preferably carried out in a cooking mixer, for example a Stephan universal machine, UMC model, or in a Karl Schnell processing machine. Alternative heating options are likewise realizable. Very particularly preferably, the production of the pumpable mass is also carried out by addition of water to the pasty mass in such a device.

It has been found that, surprisingly, the approximation of the microstructure of the food product according to the invention to the microstructure of a traditional cream cheese makes it possible to simulate or reproduce well a cream cheese, not only with respect to its texture properties, but also with respect to its lightness and color, i.e., with respect to the coordinates in the CIELAB color space. Preferably, a heating and/or mechanical processing step according to the invention namely results in a distinct or measurable increase in lightness, i.e., the base coordinate L* in the CIELAB color space, by an amount of at least 5, preferably by an amount from a value range between 5 and 25. As a result, a fresh or healthy visual impression of the food product according to the invention is obtained or ensured, especially when the base coordinate L* has a value of at least 78, preferably at least 80, very particularly preferably from a value range between 80 and 95 or more. Fundamentally, it has been established that the particularly high lightness values can be achieved comparatively easily when the nuts and/or seeds, for example solely almonds, are appropriately selected. An appropriate selection of the nuts and/or almonds is important especially with respect to the setting of the further coordinates a* and b* in the CIELAB color space, since they are less strongly influencable by the method according to the invention than the lightness L*. In order to achieve a very particularly preferred, whitest possible hue, the value a* is preferably between −3 and +1 and/or the value b* is between −1 and +9 for the food product according to the invention. Such a (very) white or natural cream cheese impression can be achieved especially through the selection of comparatively light nuts and/or seeds, for example by the food product being produced especially solely, at least analogously, on the basis of cashews and/or very particularly preferably from especially blanched almonds. Blanching is understood to mean the removal of the dark seed skin from the light almond seed.

In principle, it is advantageous, in the case of the nuts and/or seeds used, to remove any dark seed skin for the production of the pasty mass, preferably by blanching. In other words, the pasty mass preferably does not contain any dark seed skins of the nuts and/or seeds, making it possible to obtain a particularly light, uniform product.

In a further development of the invention, it is advantageously envisaged that the provided pasty mass consists (solely) of comminuted nuts and/or almonds. The pasty mass is, as explained at the start, preferably generated before the provision in a separate step as a further method development (itself). Preferably, the pasty mass is or has been produced without addition of water and/or without addition of salt, and/or without addition of sugar and/or without addition of an emulsifier, very particularly preferably without further ingredients except nuts and/or almonds. Beater knife mills and/or ball mills, for example, are suitable for obtaining the pasty mass, especially from nuts and/or seeds. The pasty mass can also be referred to as butter, for example for the preferred use of solely or mostly almonds as almond butter.

As explained at the start, an essential step of the method according to the invention for obtaining the food product according to the invention is the mechanical processing of the heated or (not yet) heated pumpable mass, i.e., the realization of a homogenization step which is intensive in the broadest sense and which is mainly responsible for the desired microstructuring. In particular, the mechanical processing is to be executed such that a high mechanical stress, especially pressure and/or shear force stress, on the particles is achieved. Particularly good experiences were had in one embodiment of the method, in which the mechanical processing comprises a high-pressure homogenization step, for example a one-step or multistep, especially two-step, high-pressure homogenization, as is used for example for the homogenization of fresh milk. In this connection, high-pressure homogenization is understood to mean the conveyance of the pumpable mass through a nozzle, for example die, at high pressures, especially between 25 bar and 600 bar, very particularly preferably between 100 bar and 400 bar, with the pressure jet striking an impact surface, for example an impact ring. Such a high-pressure homogenization can be done in one step, i.e., that the entire pressure reduction is achieved by means of one nozzle or in one homogenization step, or alternatively in multiple steps, especially such that a step-by-step reduction of a starting pressure ending especially in atmospheric pressure is achieved. Merely by way of example, it is possible to use for the mechanical processing step a two-step high-pressure homogenization device from HST-Maschinenbau GmbH having the designation HL2.5-550K.

As explained, the mechanical processing is, however, expressly not limited to a high-pressure homogenization. It is additionally or alternatively possible to use other mechanical processing methods, such as, for example, with a dissolver as described in EP 2 052 772 B1, or suitable rotor-stator systems such as, for example, shear pumps, other pump-nozzle systems, systems in which the product is exposed to cavitation, or systems in which the product under pressure is exposed to a spontaneous depressurization.

It is particularly preferred when the pH of the foodstuff is adjusted to a value <5.5, preferably from a value range between 4 and 5.4 and more preferably between 4.6 and 5.0. The pH adjustment serves primarily to improve the shelf life and to positively influence protein denaturation and swelling for improved simulation of the properties of a traditional cream cheese. The acidification expressly does not serve to adjust the consistency or the rheologiscal properties, especially since a relevant influence of the acidification distinctly recedes behind the influence of the heating and the mechanical processing—in particular, by way of example, any influence on an increase in consistency upon direct acidification of the pasty mass is less than 15% of the absolute rise in viscosity when using the method according to the invention.

With respect to the time of acidification and the acidification method, there are various possiblities. For instance, the pasty mass can already be acidified and/or the pumpable mass can be acidified and this can be acidified before and/or during and/or after the heating and/or (before and/or during and/or after) the mechanical processing. In principle, the acification can be achieved by addition of an acid authorized or suitable for foodstuffs, such as citric acid and/or acetic acid. Additionally or alternatively, an acidification can be achieved by addition of microorganisms and corresponding fermentation, it being possible in principle to carry out said fermentation in different method steps. For instance, the pasty mass and/or the pumpable mass can be carried out before or after the heating and also before or after the mechanical processing. If heating is carried out before the fermentation or addition of bacteria, the mass is first cooled to a temperature <45° C. Also, it is possible to perform an acidification by addition of an acidic foodstuff, such as lemon juice or vinegar.

If the acidification is achieved using microorganisms, one or more of the following species is/are preferably used: *Streptococcus thermophilus; Lactobacillus delbrueckii* ssp. *bulgaricus; Lactobacillus delbrueckii* ssp. *lactis; Lactobacillus delbrueckii* ssp. *delbrueckii; Lactobacillus acidophilus; Lactobacillus plantarum; Lactobacillus rhamnosus; Lactobacillus casei; Lactobacillus paracasei; Lactobacillus buchneri; Lactobacillus parabuchneri; Lactococcus lactis* ssp. *cremoris; Lactococcus lactis* ssp. *lactis; Lactococcus lactis* ssp. *lactis* biovar. diacetylactis; *Leuconostoc lactis; Leuconostoc mesenteroides* ssp. *cremoris; Leuconostoc mesenteroides* subsp. *mesenteroides; Bifidobacterium lactis.*

With respect too to the time and the amount of a preferred addition of oil and/or fat, there are various possiblities. In principle, it is possible for the provided mass to already contain added oil and/or fat, which is preferably already added when obtaining the pasty mass, especially when comminuting the seeds and/or nuts. Additionally or alternatively, oil and/or fat can be added to the (finished) pasty mass in addition to the water in order to obtain the pumpable mass. Regardless of the time of addition of oil and/or fat, it is advantageous to select the added amount such that the added oil and/or fat proportion of the finished food product corresponds between 0% and 20%, preferably between 0.1% and 20%, by preference between 5% and 15%. Also, it is possible to select the addition of oil and/or fat such that the finished food product has a (total) proportion by weight of fat between 20% and 80% fat in the dry mass. If oil and/or fat is added to the pasty mass or to the mixture of water and pasty mass for obtaining the pumpable mass, it is preferably warmed such that the added fat melts and is thus present in liquid form.

As already mentioned at the start, it is particularly preferred when the heating step is carried out in a cooking mixer, for example a Stephan universal machine, in particular the UMC model, or alternatively in a Karl Schnell processing machine, in which machines mechanical processing is then also already carried out.

As likewise already mentioned at the start, the heating step is preferably carried out as a pasteurization step, preferably at a temperature between 65° C. and 140° C. and/or a holding time of below 3600 s, or at least such that the microbial count of the finished food product is <1000 per gram.

Preferably, the pasty mass is produced or contains, preferably solely, nuts and/or seeds which are not roasted, but merely dried, wherein the residual water content of the nuts and/or seeds is preferably less than 4% by weight, preferably less than 2% by weight. Preferably, the total water content of the pasty mass is also less than 4% by weight, yet further preferably less than 2% by weight. It is particularly appropriate when, in the case of the provision of the nuts and/or seeds for obtaining the pasty mass or of the pasty mass, oil and/or fat is added in an amount resulting in a water content of less than 2% by weight.

In a particularly preferred embodiment of the method or the food product, it is preferred when the provided mass is solely produced from or solely consists of nuts and/or seeds, and particularly good experiences have been made, especially with respect to a high lightness and/or a high degree of whiteness of the finished food product, when the pasty mass does not consist of nuts, but solely of seeds and very particularly preferably of blanched almonds, or is not obtained from nuts, but solely from seeds and very particularly preferably from blanched almonds.

If required, it is possible to add salt to the pasty mass and/or to the pumpable mass (to the latter before and/or during and/or after the heating, and/or before and/or during and/or after the mechanical processing), especially in an amount such that the salt content of the food product is between 0.05% by weight and 4% by weight, very particularly preferably between 0.1% by weight and 2% by weight.

It is particularly appropriate when the addition of total water during the method is selected such that the water content of the food product is between 20% by weight and 95% by weight, particularly between 50% by weight and 82% by weight, preferably between 60% by weight and 72% by weight.

As further ingredients, it is possible to add, for example, herbs and/or spices, and/or nuts and/or cocoa, and/or sugar, and/or vegetables, and/or fruits, especially in a total amount such that the total proportion by weight of the further ingredients in the finished food product is between 0.01% by weight and 25% by weight.

Also, it is possible and preferred that, during the method, a thickener authorized for foodstuffs, especially in accordance with the regulation on the authorization of additives, is added, especially locust bean gum, preferably for the purpose of texture adjustment and/or dry mass exchange. Preferably, the total proportion by weight of thickeners in the finished food product is between 0.01% by weight and 25% by weight. Also, it is possible to completely dispense with thickeners.

Also, it is possible to add at least one emulsifier, preferably in accordance with the authorization regulation, during the method, especially with a total proportion by weight of the finished food product between 0.01% and 25% for the purpose of further optimization of fat-droplet comminution and fat-droplet incorporation. The use of an emulsifier usually leads to the additional stabilization of the small droplets generated in the mechanical step, which droplets then appear in the partially disrupted state as an additional peak at a particle size <10 μm. Preference is given to dispensing with the use of emulsifiers.

It is particularly appropriate when the heating and especially the mechanical processing is carried out such that the particle size distribution of the food product in the undisrupted state has an x10,3 particle diameter from a value range between 5 μm and 15 μm and/or an x90,3 particle diameter from a value range between 20 μm and 75 μm.

The invention also leads to a food product which is characterized by the particle size parameters explained at the start in connection with the method according to the invention, especially a preferred mean particle diameter x50, 3<100 μm, preferably between 10 μm and 40 μm, in the undisrupted state, and also by at least one peak, especially a global maximum, in the particle size distribution at a volume-specific particle diameter (equivalence diameter) x3<10 μm. In the partially disrupted state, it is possible to observe, compared with the undisrupted state, an additional peak in a size range <10 μm.

The advantageous configurations explained below in connection with the food product also influence advantageous configurations of the method, by appropriate ingredients being added there, method steps being appropriately selected and/or ratio values being adjusted. Self-evidently, this also works the other way round: advantageous configurations or variants of the method may lead to embodiments of the food product according to the invention that are possibly not explicitly explained, but are claimable.

For instance, it is particularly preferred when the food product contains between 5% by weight and 50% by weight of the pasty mass, the nut and/or seed content of the pasty mass being very particularly preferably 100% by weight, but preferably at least 70% by weight, very particularly preferably 80% by weight, yet further preferably 90% by weight.

It is particularly appropriate when the total proportion of added fat and/or oil of the finished food product is selected from a value range between 0% by weight and 20% by weight, especially between 0.1% by weight and 20% by weight. Additionally or alternatively, it is advantageous when the total water content of the finished food product is between 50% by weight and 82% by weight, very particularly preferably between 60% by weight and 72% by weight, and/or the oil and/or fat content in the dry mass is between 30% by weight and 80% by weight, preferably between 50% by weight and 75% by weight, and/or the salt content is between 0.05% by weight and 4% by weight, preferably between 0.1% by weight and 2% by weight.

For the simulation of a cream cheese product, it has been found to be particularly advantageous when the firmness, measured as explained at the start, of the food product is adjusted such that it has a value from a value range between 0.2 N and 7.0 N, preferably between 0.5 N and 2.5 N, measured in each case at 10° C.

Altogether, it is advantageous when the majority, preferably at least 90% by weight, more preferably at least 98% by weight, of the total oil and/or fat proportion of the food product (self-evidently in the undisrupted state) is incorporated in microgel particles based on nuts and/or seeds, i.e., is not present as a free fat phase. Particular preference is given to one embodiment in which no free fat droplets can be identified when observing in the water-dispersed, undisrupted state of the food product under a light microscope at 40-fold magnification.

It is very particularly preferred when the food product is free of ingredients based on (animal) milk—particularly preferably, the food product is vegan.

The food product according to the invention can be used in different ways. Particular preference is given to using the food product purely (independently) as foodstuff or alternatively as component of a preferably industrially produced food product. For instance, it is also possible to use the food product according to the invention as a mixture with milk products, for example in cream cheese, yoghurt or quark.

Specific examples of preferred uses or intended purposes are the use as spread or as filling or recipe component of bakery products, or confectionary products or antipasti, or pasta, or as component of delicatessen salad, or sauces, or dressings, as use in ice cream or, in particular, purely for use as cheese substitute, especially cream cheese substitute.

Use as raw material or recipe component of other cheese substitutes, such as, for example, substitutes for quark, mozzarella as well as hard cheese and sliceable cheese, is possible too.

Also, it is possible to add animal products, such as cream or butter, to the food product during the production, especially in order to adjust the fat content, and/or to use the food product as additive to butter-containing or cream-containing foodstuffs. In this case, the food product or the foodstuff is self-evidently not vegan.

Figure 5:
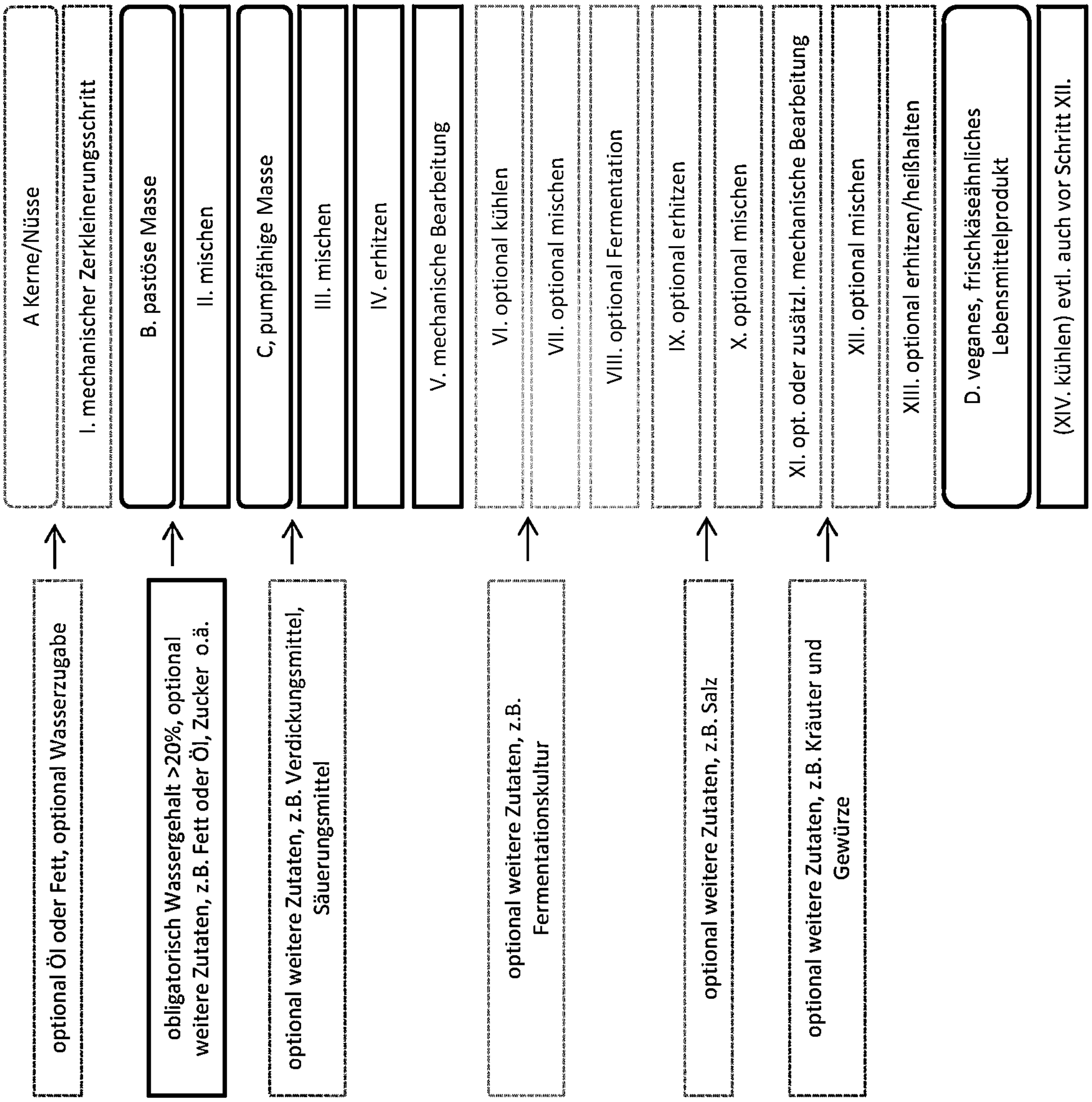
FIG. 5 shows a block diagram illustrating a possible configuration of a method according to the invention.

The block diagram according to FIG. 5 will be used to explain below the possible configuration of a method according to the invention having a multiplicity of optional method steps.

The first essential method step is step B. There is provided a pasty mass, which can optionally be obtained in a preceding method step A from seeds and/or nuts by means of a mechanical comminution step, it being possible to optionally add oil and/or fat for the production of the pasty mass.

An addition of water is optional, preference being given to dispensing with an addition of water for the production of the pasty mass. The pasty mass can, for example, be produced on the basis of dried, preferably unroasted almonds having a residual water content of <2% by weight, and the comminution can, for example, be carried out using a beater knife mill and/or ball mill. If the pasty mass is produced solely on the basis of almonds, i.e., no nuts or other seeds, the pasty mass is an almond butter.

As a further essential method step, the pumpable mass C is produced, specifically by mixing (step II) the pasty mass with water, and so the proportion by weight of dry mass of the pumpable mass is <80%, corresponding to a water content >20%. Optionally, the addition of ingredients such as fat, oil and/or sugar is possible. If required, it is possible to add to the pumpable mass further ingredients, such as thickeners, for example locust bean gum, and/or acidifiers, such as citric acid and/or acetic acid. This is then followed by a (further) mixing step III and a heating step IV and also a mechanical processing V, preferably a high-pressure homogenization. Steps II to IV and possibly also additionally steps IV to IX, which are to be explained later, or individual ones of these steps can, for example, be carried out in a cooking mixer.

The heating step can, for example, also be carried out after the mechanical processing. In any case, heating and mechanical processing results in a food product according to the invention that is preferably vegan and cream cheese-like (see D).

Preferably after the mechanical processing, it is possible to realize a multiplicity of optional method steps evident from the block diagram, which method steps are performable individually or in any combination and are also claimable. For example, after an optional cooling after the mechanical processing, it is possible, in addition to or as an alternative to a prior addition of acid, to add a fermentation culture for the purpose of acidification, and in this case there is optionally a mixing according to step VII and thereafter an optional fermentation according to step VIII. For the inactivation of the microorganisms, it is then optionally possible to carry out a heating step IX and, if required, it is then possible to add further ingredients, such as salt. If said further ingredients, such as salt, are added, an optional mixing takes place in step X.

If required, further or alternative ingredients such as herbs or spices can be added and/or a further additional mechanical processing can be carried out, for example an additional high-pressure homogenization, when a certain particle/fat distribution is to be achieved.

Preference is given to cooling the food product, especially when this has not yet been done beforehand (see step XIV).

A recipe/method designed, by way of example, according to the concept of the invention is as follows:

There is produced or provided a pasty mass which was produced solely from almonds, especially by grinding of the almonds. The proportion by weight of the almonds is, by way of example, 17.2% by weight of the finished food product. The finished food product contains a total proportion by weight of water of, by way of example, 69.25% by weight, the addition of water necessary for this purpose being added to the pasty mass in order to obtain the pumpable mass. Furthermore, oil and/or fat is added in order to obtain the pumpable mass, and so, in one amount, the total fat and/or oil proportion of the finished food product is 12.5%.

Furthermore, for the production of the pumpable mass, salt is added, and also citric acid, specifically salt in an amount such that the total proportion by weight of salt of the finished food product is 0.8% by weight and the proportion by weight of citric acid is 0.25% by weight.

The pumpable mass thus obtained is heated in a cooking mixer to a temperature of 85° C., with said temperature being held for 120 s.

After the heating, a two-step high-pressure homogenization is carried out, with 400 bar being released in the first pressure step and 80 bar being released in the second pressure step.

This is followed by a cooling to room temperature.

The particle size distributions of the food product which was produced from this exemplary recipe resulting from the concept of the invention are depicted in FIG. 2, and also depicted are the micrographs in images b1 to b3 according to FIG. 1 in the undisrupted state (image b1) and in the disrupted state b2 and b3.

The invention claimed is:

1. A cream cheese-like food product containing comminuted nuts and/or seeds, wherein the cream cheese-like food product has a firmness measured at 10° C. from a value range between 0.2 N and 7.0 N, which firmness is measured at 10° C. using a texture testing machine in which a round punch having an area of 1.27 $cm^2$ penetrates into a sample at a rate of 2 mm/s, wherein the cream cheese-like food product has, in an undisrupted state, a particle size distribution which is characterized by a particle size distribution, as measured in distilled water, having a mean particle diameter $x_{50,3}$<100 μm, and wherein total water content of a finished food product is between 50% by weight and 82% by weight, and wherein at least 90% by weight of an oil and/or fat proportion of the food product is incorporated in microgel particles based on nuts and/or seeds.

2. The food product as claimed in claim 1, wherein the particle size distribution of the food product in the undisrupted state has an $x_{10,3}$ particle diameter from a value range between 5 and 15 μm and/or $x_{90,3}$ particle diameter from a value range between 20 and 75 μm.

3. The food product as claimed in claim 1, wherein the food product is free of ingredients based on milk.

4. The food product as claimed in claim 1, wherein the pH is from a value range between 4.0 and 5.4.

5. The food product as claimed in claim 1, wherein the fat content in a dry mass is between 30 and 80% by weight, and/or wherein a NaCl content is between 0.05 and 4% by weight.

6. The food product as claimed in claim 1, wherein the color of the food product in the CIELAB color space with the Cartesian base coordinates L*, a*, b* according to EN ISO 11664-4:2011 is defined by L*≥78 and/or a* between −3 and +1 and/or b* between −1 and +9.

7. A foodstuff comprising, as a filling or additive, the food product as claimed in claim 1 as pure foodstuff or as recipe component selected from a filling or additive in an industrially produced foodstuff.

8. The food product as claimed in claim 1, wherein the food product contains between 5% by weight and 50% by weight of a pasty mass comprising a content of nuts and/or seeds of at least 70% by weight.

9. The food product as claim in claim 8, wherein the pasty mass is obtained by the comminution of nuts and/or almonds, without addition of sugar.

10. The food product according to claim 1, wherein dry mass content of the food product is between 28% by weight and 40% by weight.

11. The food product according to claim 1, wherein the product exhibits at least one peak at a particle diameter x3>10 μm, and wherein the food product has, in a partially disrupted state obtained by mixing one part by weight of the food product with nine parts by weight of an SDS-EDTA solution (0.25% SDS; 0.25% EDTA), a particle size distribution, as measured in distilled water, which has, compared to the undisrupted state, at least one additional peak at a particle diameter x3<10 μm.

12. The food product as claimed in claim 1, wherein the comminuted nuts and/or seeds are comminuted almonds.

13. The food product as claimed in claim 1, wherein the mean particle diameter is between 10 and 40 μm.

14. The food product as claimed in claim 1, wherein at least 98% by weight of the oil and/or fat proportion of the food product are incorporated in microgel particles based on nuts and/or seeds.

15. The food product as claimed in claim 3, wherein the food product is vegan.

16. The food product as claimed in claim 4, wherein the pH is between 4.6 and 5.0.

17. The food product as claimed in claim 5, wherein the fat content in the dry mass is between 50 and 75% by weight and/or wherein the NaCl content is between 0.1 and 2% by weight.

18. The food product as claimed in claim 11, wherein the at least one peak is a global maximum.

19. The food product as claimed in claim 1, which is made according to a method comprising the steps:
- providing a mass of comminuted nuts and/or seeds;
- adding water to the mass and obtaining a pumpable mass, achieving a proportion by weight of dry mass of the pumpable mass <80%;
- obtaining the food product from the pumpable mass by heating to a temperature from a temperature range between 65° C. and 140° C. and mechanical processing such that
  - the food product obtained has, in an undisrupted state, a particle size distribution which is characterized by a particle size distribution, as measured in distilled water using a laser diffraction spectrometer, having a mean particle diameter x50,3<100 μm, and also by at least one peak at a particle diameter x3>10 μm, wherein the provided mass of comminuted nuts and/or seeds is a paste, and wherein the heating step is carried out before and/or during the mechanical processing, and wherein the total water content of the finished food product is between 60% by weight and 72% by weight, and wherein the fat content in the dry mass of the food product is between 50 and 75% by weight, and wherein the food product has a firmness from a value range between 0.2 N and 7.0 N, which firmness is measured at 10° C. using a texture testing machine in which a round pressing punch having an area of 1.27 $cm^2$ penetrates into a sample at a rate of 2 mm/s, wherein dry mass content of the food product is between 28% by weight and 40% by weight, wherein the food product contains between 5% by weight and 50% by weight of the paste, and wherein the paste comprises a content of the nuts and/or seeds of at least 70% by weight.

* * * * *